(12) United States Patent
Bode

(10) Patent No.: US 6,478,470 B1
(45) Date of Patent: Nov. 12, 2002

(54) NEEDLE BEARING

(75) Inventor: Helmut Bode, Herzogenaurach (DE)

(73) Assignee: Ina Wälzlager Schaeffler oHG, Herzogenaurach (DE)

(*) Notice: Subject to any disclaimer, the term of this patent is extended or adjusted under 35 U.S.C. 154(b) by 0 days.

(21) Appl. No.: 09/623,400

(22) PCT Filed: Nov. 26, 1998

(86) PCT No.: PCT/EP98/07635

§ 371 (c)(1),
(2), (4) Date: Oct. 2, 2000

(87) PCT Pub. No.: WO99/45284

PCT Pub. Date: Sep. 10, 1999

(30) Foreign Application Priority Data

Mar. 4, 1998 (DE) .......................................... 198 09 171

(51) Int. Cl.⁷ ............................................... F16C 33/66
(52) U.S. Cl. ......................... 384/473; 384/565; 384/569
(58) Field of Search ................. 384/565, 569, 384/473, 462, 484

(56) References Cited

U.S. PATENT DOCUMENTS

| | | |
|---|---|---|
| 1,205,449 A | 11/1916 | Hart |
| 1,469,991 A | 10/1923 | Armstrong |
| 2,251,555 A | 8/1941 | Schermer |
| 2,334,227 A | 11/1943 | Stallman |
| 2,747,949 A | 5/1956 | Smith |
| 3,539,232 A | 11/1970 | Batt |

FOREIGN PATENT DOCUMENTS

| | | |
|---|---|---|
| CH | 356 644 A | 10/1961 |
| DE | PS 16 14 72 | 6/1905 |
| DE | PS 6 12 425 | 4/1935 |
| DE | PS 9 36 306 | 12/1955 |
| DE | 19 37 143 U | 9/1965 |
| DE | 73 35 363 U | 12/1973 |
| DE | 43 37 466 A | 5/1995 |
| DE | 44 41 237 A1 | 7/1995 |
| DE | 195 05 740 A | 8/1996 |
| FR | 945 700 A | 5/1949 |

OTHER PUBLICATIONS

Soviet Patents Abstracts Section PQ, Week 9301 Derwent Publications Ltd., London, GB; Class Q62, AN 93–007572 XP002100458 & SU 1 712 694 A (Kasylkasov Zhenys M), Feb. 15, 1992 see abstract.

Jahn, R: Bauformen und Anwendungsbereiche der Nagdellager. In: technica, No. 16, 1961, p. 1035–p. 1038.

Prospect: Cages á aiguilles Roulements á aiguilles, FA. INA–Roulements S. á.r.l., Homburg, Sep. 1954, p, E1, E4.

INA–Catalog Nadellager [needle bearing], Zylinderrollenlager, [cylindrical roller bearing] p. 306, 1991.

Primary Examiner—Lenard A. Footland
(74) Attorney, Agent, or Firm—Henry M. Feisereisen

(57) ABSTRACT

The invention relates to a needle bearing with an outer ring (1) terminating on both its ends in a collar (2, 3), and with bearing needles (4) guided in a cage in axis parallel disposition, as well as with a lubricant reservoir (9) arranged in the bearing. This bearing is characterized in that the lubricant reservoir (9) is formed by a groove (8), arranged in the outer ring (1), and by a middle part (5) of the bearing needles (4), with the middle part having a reduced diameter in relation to the remaining diameter of the bearing needles (4).

18 Claims, 1 Drawing Sheet

NEEDLE BEARING

FIELD OF THE INVENTION

The invention relates to a needle bearing with an outer ring terminating on both its ends in a collar, and with bearing needles guided in a cage in axis parallel disposition, as well as with a lubricant reservoir arranged in the bearing.

BACKGROUND OF THE INVENTION

Such needle bearings as bearings of smallest radial height are generally known and include an outer ring and a needle rim which form together a structural unit. These bearings permit particular cost-efficient rolling contact bearings of high load-carrying capability. The precise guidance of the needle rollers in the cage ensures a reliable operation of such a bearing even at high numbers of revolution (INA-Catalog Nadellager [needle bearing], Zylinderrollenlager [cylindrical roller bearing], p. 306, 1991).

The reservoirs disposed in the bearing and filled with lubricant ensure a reliable lubrication of the bearing over a longer period, thereby increasing the service life.

A drawback is however the limited size of the lubricant reservoirs as a consequence of the small radial structural height. DE 44 41 237 attempted to eliminate this deficiency by providing an additional lubricant reservoir between a collar and the bearing needles. This was realized, for example, by providing the collar about its inner face with axial bulges which are evenly spaced about the circumference so as to form free spaces therebetween for receiving lubricant. Another possibility according to this prior art is implemented by arranging between the collar and the collar of the bearing cage a circular ring which includes at least over a portion of its radial extension elevations which are evenly spaced about the circumference and face the cage, so that free spaces are formed therebetween for receiving lubricant.

These solutions have shortcomings because, on the one hand, the provision of such additional lubricant reservoirs between collar and bearing needles is very complicated, and, on the other hand, the axial dimension of such a bearing is increased.

SUMMARY OF THE INVENTION

It is thus an object of the present invention to provide a needle bearing of the afore-stated type with an additional lubricant reservoir which is easy to make and does not enlarge the axial dimension of such a bearing in an undesired manner.

This object is attained in accordance with the invention by forming the lubricant reservoir through a groove disposed in the outer ring and through a middle part of the bearing needles, whereby the diameter of the middle part is reduced in relation to the remaining diameter of the bearing needles.

The manufacture of the groove, which points in the direction of the bearing needles, can be easily integrated in the overall fabrication process of the outer ring so that complicated shaping processes and/or punching of the collars are eliminated. Also an additional manufacture of components for enlarging the grease reservoir is no longer required. In addition, the manufacture of the bearing needles, which have a reduced diameter in mid-section, poses no technical problems. As a consequence of the configuration of the needle bearing in accordance with the invention, the. axial dimension of the needle bearing is not unnecessarily extended as the provision of the lubricant reservoir is accompanied only by a slight restriction of the load-carrying capability. Furthermore, the provision of an enlarged lubricant reservoir results in a lubrication of a bearing of small radial structural height throughout its service life or the periods for re-lubrication can be extended.

Advantageous configurations of the invention are described in the dependent claims set forth hereinafter. In accordance with another feature of the present invention, the groove extends over the entire circumference of the inner surface area of the outer ring or only over a portion thereof. According to another feature of the present invention a seal is disposed between the bearing needles and the collars. Needle bearings, sealed in this manner and typically including lip seals, protect the bearing under operational conditions from dirt or splash water as well as from loss of lubricant. According to another feature of the present invention a collar can be replaced by a closed bottom. Such needle bearings, called needle bushings, seal bearing areas at shaft ends and are suitable for absorbing start-up forces. Furthermore, they represent an effective accident protection when the shaft rotates.

An exemplified embodiment of the invention will now be described in more detail.

DETAILED DESCRIPTION OF THE DRAWING

Figure 1:
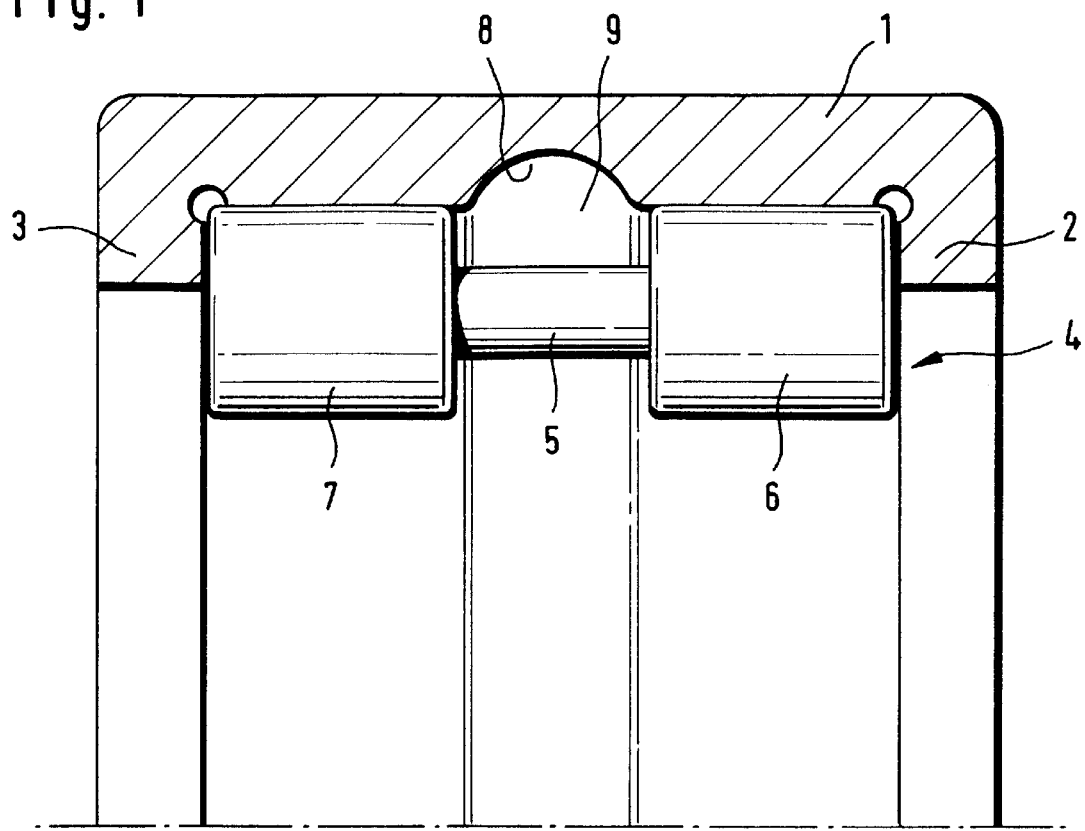
FIG. 1 shows an axial section through a needle bearing designed in accordance with the invention.

The needle bearing according to the invention, shown in FIG. 1, includes an outer ring 1 which is provided on either of its both ends with a radially inwardly directed collar 2 and 3. Disposed in a cage (not shown) between these two collars 2 and 3 are bearing needles 4 which have a body portion made of a middle part 5 and two outer parts 6 and 7, with the middle part 5 having a reduced diameter in relation to the outer parts 6 and 7. As a result of this stepped bearing needle 4, also designated as bone-shaped roller, and a groove 8, arranged in the outer ring 1, a reservoir 9 is formed for receiving lubricant. This reservoir 9 filled with lubricant is bounded by the outer surface area of the middle part 5, the two confronting end faces of the outer parts 6 and 7, as well as by the groove 8 of the outer ring 1.

Figure 2:
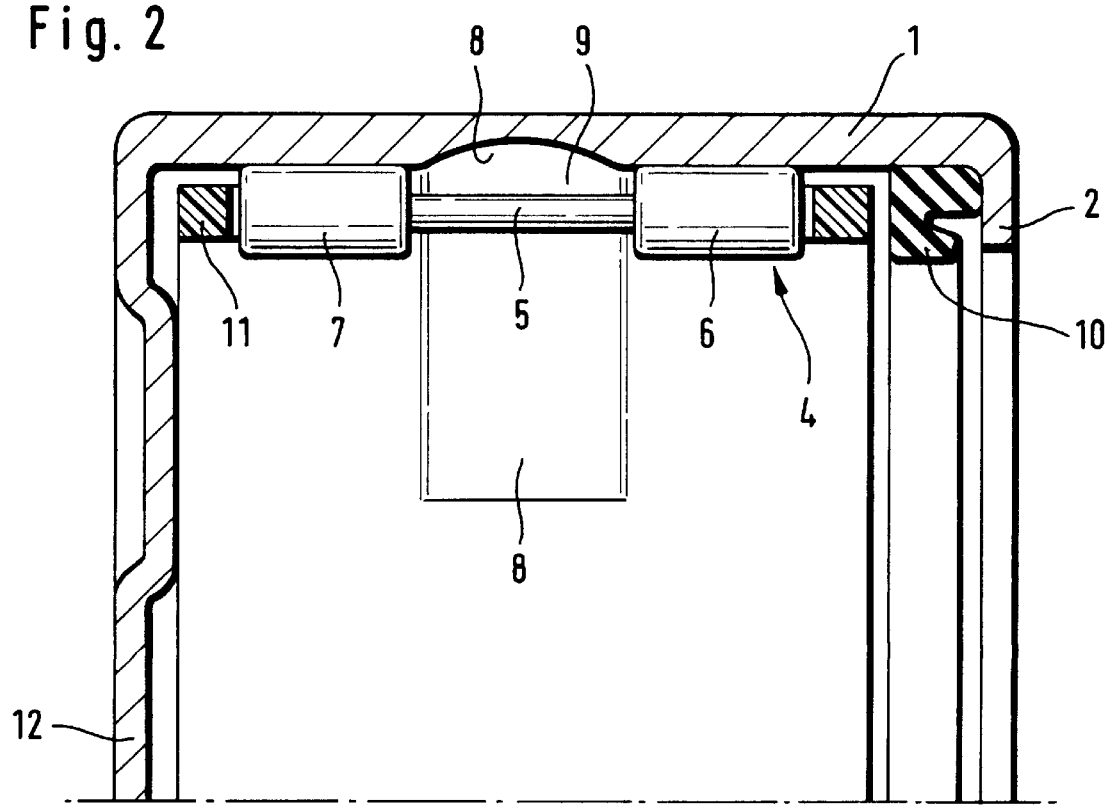
FIG. 2 is a sectional view of another embodiment of a needle bearing in accordance with the present invention

Turning now to FIG. 2, there is shown a sectional view of another embodiment of a needle bearing in accordance with the present invention. Parts corresponding with those in FIG. 1 are denoted by identical reference numerals and not explained again. In this embodiment, provision is made for a closed bottom 12, instead of the collar 3. Also shown in FIG. 2 is a cage 11 for retaining the bearing needles 5. Reference numeral designates a seal arranged between the bearing needles 4 and the collar 2. In the embodiment of FIG. 2, the groove 8 extends only over a portion of the inner peripheral surface of the outer ring 1.

What is claimed is:

1. Needle bearing with an outer ring (1) terminating on both its ends in a collar (2, 3), and with bearing needles (4) guided in a cage in axis parallel disposition, as well as with a lubricant reservoir (9) arranged in the bearing, characterized in that the lubricant reservoir (9) is formed by a groove (8), arranged in the outer ring (1), and by a middle part (5) of the bearing needles (4), with the middle part having a reduced diameter in relation to the remaining diameter of the bearing needles (4), wherein a seal is arranged between the bearing needles (4) and the collars (2, 3).

2. Needle bearing according to claim 3, characterized in that the groove (8) extends over the entire circumference of the inner peripheral surface of the outer ring (1), or only over a portion thereof.

3. Needle bearing with an outer ring (1) terminating on both its ends in a collar (2, 3), and with bearing needles (4) guided in a cage in axis parallel disposition, as well as with a lubricant reservoir (9) arranged in the bearing, characterized in that the lubricant reservoir (9) is formed by a groove (8), arranged in the outer ring (1), and by a middle part (5) of the bearing needles (4), with the middle part having a reduced diameter in relation to the remaining diameter of the bearing needles (4), wherein the collar (3) is replaced by a closed bottom.

4. Needle bearing according to claim 3, characterized in that the groove (8) extends over the entire circumference of the inner peripheral surface of the outer ring (1), or only over portion thereof.

5. A needle bearing, comprising:

an outer ring having opposite ends which are turned inwardly, said outer ring having an inner peripheral surface formed interiorly with a groove;

a plurality of bearing needles guided on the inner peripheral surface of the outer ring, each of said bearing needles having a body portion defined by a first diameter, said body portion having a middle part defined by a second diameter which is smaller than the first diameter, wherein the groove and the middle part define together a reservoir; and lubricant located in the reservoir, wherein one of the opposite ends defines a first collar, the other one of the opposite ends terminating in a closed bottom.

6. The needle bearing of claim 5, wherein the inner peripheral surface defines a circumference, said groove extending over at least a portion of the circumference of the inner peripheral surface of the outer ring.

7. The needle bearing of claim 5, wherein the inner peripheral surface defines a circumference, said groove extending over the entire circumference of the inner peripheral surface of the outer ring.

8. A needle bearing, comprising:

an outer ring having opposite ends which are turned inwardly, said outer ring having an inner peripheral surface formed interiorly with a groove;

a plurality of bearing needles guided on -the inner peripheral surface of the outer ring, each of said bearing needles having a body portion defined by a first diameter, said body portion having a middle part defined by a second diameter which is smaller than the first diameter, wherein the groove and the middle part define together a reservoir, lubricant located in the reservoir; and a seal arranged between the bearing needles and the opposite ends.

9. The needle bearing of claim 8, wherein one of the opposite ends defines a first collar and the other one of the opposite ends defines a second collar.

10. The needle bearing of claim 8, wherein the inner peripheral surface defines a circumference, said groove extending over at least a portion of the circumference of the inner peripheral surface of the outer ring.

11. The needle bearing of claim 8, wherein the inner peripheral surface defines a circumference, said groove extending over the entire circumference of the inner peripheral surface of the outer ring.

12. A needle bearing, comprising:

an outer ring having opposite ends which are turned inwardly, said outer ring having an inner peripheral surface formed interiorly with a groove, wherein one of the opposite ends defines a first collar and the other one of the opposite ends terminates in a closed bottom; and a plurality of bearing needles guided on the inner peripheral surface of the outer ring, each of said bearing needles having a body portion defined by a first diameter, said body portion having a middle part defined by a second diameter which is smaller than the first diameter.

13. The needle bearing of claim 12 wherein the inner peripheral surface defines a circumference, said groove extending over at least a portion of the circumference of the inner peripheral surface of the outer ring.

14. The needle bearing of claim 12 wherein the inner peripheral surface defines a circumference, said groove extending over the entire circumference of the inner peripheral surface of the outer ring.

15. A needle bearing, comprising:

an outer ring having opposite ends which are turned inwardly, said outer ring having an inner peripheral surface formed interiorly with a groove;

a plurality of bearing needles guided on the inner peripheral surface of the outer ring, each of said bearing needles having a body portion defined by a first diameter, said body portion having a middle part defined by a second diameter which is smaller than the first diameter; and a seal arranged between the bearing needles and the opposite ends.

16. The needle bearing of claim 15, wherein one of the opposite ends defines a first collar and the other one of the opposite ends defines a second collar.

17. The needle bearing of claim 15, wherein the inner peripheral surface defines a circumference, said groove extending over at least a portion of the circumference of the inner peripheral surface of the outer ring.

18. The needle bearing of claim 15, wherein the inner peripheral surface defines a circumference, said groove extending over the entire circumference of the inner peripheral surface of the outer ring.

* * * * *

UNITED STATES PATENT AND TRADEMARK OFFICE
CERTIFICATE OF CORRECTION

PATENT NO. : 6,478,470 B1
DATED : November 12, 2002
INVENTOR(S) : Helmut Bode

It is certified that error appears in the above-identified patent and that said Letters Patent is hereby corrected as shown below:

Column 3,
Line 3, replace "3" with -- 1 --.

Signed and Sealed this

Fifth Day of August, 2003

JAMES E. ROGAN
*Director of the United States Patent and Trademark Office*